United States Patent
Narendra Trivedi et al.

(10) Patent No.: US 10,181,027 B2
(45) Date of Patent: Jan. 15, 2019

(54) INTERFACE BETWEEN A DEVICE AND A SECURE PROCESSING ENVIRONMENT

(71) Applicant: Intel Corporation, Santa Clara, CA (US)

(72) Inventors: Alpa Narendra Trivedi, Hilsboro, OR (US); Siddhartha Chhabra, Hilsboro, OR (US); Xiaozhu Kang, Fremont, CA (US); Prashant Dewan, Hilsboro, OR (US); Uday Savagaonkar, Portland, OR (US); David Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/517,338

(22) Filed: Oct. 17, 2014

(65) Prior Publication Data

US 2016/0110540 A1    Apr. 21, 2016

(51) Int. Cl.
*G06F 21/53*    (2013.01)

(52) U.S. Cl.
CPC ........ *G06F 21/53* (2013.01); *G06F 2221/033* (2013.01)

(58) Field of Classification Search
CPC .. G06F 21/71; G06F 21/1408; G06F 21/1441; G06F 2221/2111; H04L 9/3239
USPC ....................................................... 713/190
See application file for complete search history.

(56) References Cited

U.S. PATENT DOCUMENTS

| | | | |
|---|---|---|---|
| 2002/0184046 A1 | 12/2002 | Kamada et al. | |
| 2003/0033588 A1* | 2/2003 | Alexander | G06F 9/54 717/107 |
| 2003/0074177 A1* | 4/2003 | Bowen | G06F 17/5022 703/22 |
| 2003/0191719 A1* | 10/2003 | Ginter | G06F 21/10 705/54 |
| 2010/0262722 A1 | 10/2010 | Vauthier et al. | |
| 2013/0212673 A1 | 8/2013 | Datta et al. | |
| 2014/0006711 A1 | 1/2014 | Xing | |
| 2014/0157410 A1 | 6/2014 | Dewan et al. | |

(Continued)

FOREIGN PATENT DOCUMENTS

| | | |
|---|---|---|
| WO | 2010053953 | 5/2010 |
| WO | 2011-078855 A1 | 6/2011 |

OTHER PUBLICATIONS

Tiago Alves and Don Felton, TrustZone: Integrated Hardware and Software Security—Enabling Trusted Computing in Embedded Systems, Nov. 4, 2004, Information Quarterly, vol. 3, pp. 21-24.*

(Continued)

*Primary Examiner* — Ashokkumar B Patel
*Assistant Examiner* — William B Jones
(74) *Attorney, Agent, or Firm* — Trop, Pruner & Hu, P.C.

(57) ABSTRACT

Embodiments of an invention for an interface between a device and a secure processing environment are disclosed. In one embodiment, a system includes a processor, a device, and an interface plug-in. The processor includes an instruction unit and an execution unit. The instruction unit is to receive an instruction to create a secure processing environment. The execution unit is to execute an application in the secure processing environment. The device is to execute a workload for the application. The interface plug-in is to provide an interface for the device to enter the secure processing environment to execute the workload.

22 Claims, 10 Drawing Sheets

(56) References Cited

U.S. PATENT DOCUMENTS

| | | | | |
|---|---|---|---|---|
| 2014/0208435 | A1 | 7/2014 | Maor et al. | |
| 2014/0289794 | A1* | 9/2014 | Raleigh | H04L 63/20 726/1 |
| 2015/0033034 | A1* | 1/2015 | Gerzon | H04L 9/3239 713/190 |
| 2015/0113241 | A1* | 4/2015 | Martin | G06F 12/14 711/163 |
| 2016/0092702 | A1* | 3/2016 | Durham | G06F 21/72 713/190 |

OTHER PUBLICATIONS

Tiago Alves et.al, TrustZone: Integrated Hardware and Software Security, Nov. 4, 2004, Information Quarterly, vol. 3, all.*
Tiago Alves et.al, TrustZone: Integrated Hardware and Software Security, 2004, ARM. 3, all.*
Alves et al., TrustZone: Integrated Hardware and Software Security; Nov. 4, 2004; Information Quarterly; vol. 3, all (Year: 2004).*
International Search Report and Written Opinion received for PCT Patent Application No. PCT/US2015/053526, dated Feb. 19, 2016, 12 pages.
Office Action Received for Taiwanese Patent Application No. 104129959, dated Aug. 8, 2016, 6 Pages of Taiwanese Office Action and 7 Pages of English Translation.
Taiwan Intellectual Property Office, Second Office Action dated Dec. 29, 2016 in Taiwan Patent Application No. 104129959. (Translation Redacted).
Shi, et al., "vCuda: GPU-Accelerated High-Performance Computing in Virtual Machines", IEEE Transactions on Computers, IEEE, USA, vol. 61, No. 6, Jun. 1, 2012, pp. 804-816, XP011442092.
European Patent Office, Extended European Search Report dated Apr. 25, 2018 in European Patent Application No. 15851143.6.

* cited by examiner

INTERFACE BETWEEN A DEVICE AND A SECURE PROCESSING ENVIRONMENT

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated container, partition, or environment within an information processing system. Such information processing system may include one or more processors to execute one or more applications within such a container, along with one or more devices, such as graphics processors or other accelerators, to execute one or more workloads associated with the one or more applications.

BRIEF DESCRIPTION OF THE FIGURES

The present invention is illustrated by way of example and not limitation in the accompanying figures.

DETAILED DESCRIPTION

Figure 1:
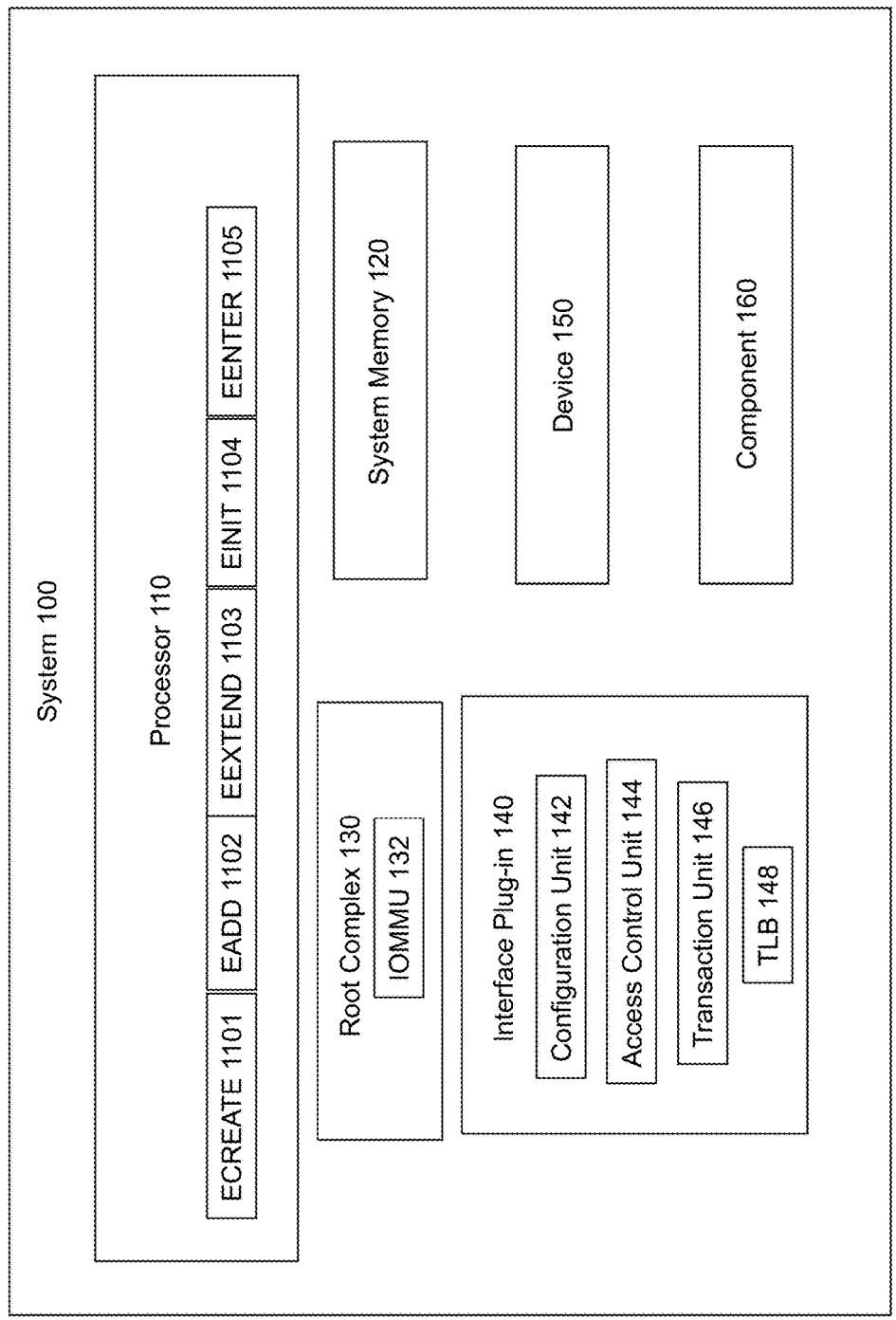
FIG. 1 illustrates a system including an interface between a device and a secure processing environment according to an embodiment of the present invention.

Embodiments of an invention for an interface between a device and a secure processing environment are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location (and "cleared" may be used to indicate the state of condition of having been cleared), and the term "set" may be used to indicate storing or otherwise causing the logical value of one, all ones, or some other specified value to be stored in a storage location (or the state or condition of having been set); however, these terms are not meant to limit embodiments of the present invention to any particular logical convention, as any logical convention may be used within embodiments of the present invention.

Also, as used in descriptions of embodiments of the present invention, a "/" character between terms may mean that an embodiment may include or be implemented using, with, and/or according to the first term and/or the second term (and/or any other additional terms).

As stated in the background section, various approaches to creating and maintaining a secured, protected, or isolated container, partition, or environment within an information processing system have been developed. One such approach involves secure enclaves as described in the co-pending U.S. patent application entitled "Method and Apparatus to Provide Secure Application Execution," filed Jun. 19, 2012, Ser. No. 13/527,547, which provides information regarding at least one embodiment of a secured, protected, or isolated container, partition, or environment. However, this reference is not intended to limit the scope of embodiments of the invention in any way and other embodiments may be used while remaining within the spirit and scope of the present invention. Therefore, any instance of any secured, protected, or isolated container, partition, or environment used in any embodiment of the present invention may be referred to herein as a secure enclave or an enclave.

In an embodiment of the present invention, a secure processing environment or container may be created by an operating system or other system level software (for convenience, any software/program used to create such a container may be referred to as an OS) and used to securely execute an application or other user level software (for convenience, any software/program executing within such a container may be referred to as an application). The OS may create the secure processing environment using certain instructions as described below, where these instructions may be executed on a processor or processor core within the information processing system. The application may be executed on that processor or processor core and/or another processor or processor core within the system. However, it may be desired to offload a workload for the application onto a device within the system other than those processor(s) or processor core(s). For example, graphics processing associated with an application may be executed by a graphics processor. Therefore, it may be desired to use an embodiment of the present invention to provide for any such graphics processor, accelerator, or other device to interface to a secure processing environment. Embodiments of the present invention may be desired to provide for a variety of different, customizable devices to execute within a system's secured processing environment framework without imposing a need for the framework to support multiple device interface architectures. Embodiments of the present invention may also be desired to allow a device to securely execute a workload in a secure processing environment without affecting the security of other secure processing environments that do not trust the device.

FIG. 1 illustrates system 100, an information processing system to include an interface between a device and a secure processing environment according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, system memory 120, root complex 130, interface plug-in 140, device 150, and component 160. Systems embodying the present invention may include any number of each of these components and any other components or other elements, such as peripherals and input/output (I/O) devices. Any or all of the components or other elements in this or any system embodiment, may be connected, coupled, or otherwise in communication with each other through any number of buses, point-to-point, or other wired or wireless interfaces, connections, and/or interconnect fabrics, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110.

Root complex 130 may represent any component, such as a chipset component, including or through which any one or more devices, such as device 150, may be connected or coupled to processor 110. Root complex 130 may include I/O memory management unit (IOMMU) 132, which may represent any circuitry or other hardware, including address translation data structures (such as a translation lookaside buffer (TLB)) and/or hardware to access address translation data structures, to translate addresses used by devices such as device 150 (e.g., linear addresses) to addresses used to access system memory 120 (e.g., physical addresses), to store information regarding the accessibility of each such physical address or group of physical addresses based on each such linear address, group of linear addresses, device identifier, bus identifier, function identifier, etc. (access permissions, e.g., read, write, and/or execute permissions), and to enforce access permissions. In an embodiment, these access permissions may be defined based at least in part on an access control policy, according to which root complex 130 may be programmed/configured by bootstrap and/or system level software/firmware.

Interface plug-in 140 may represent any circuitry or other hardware or firmware to implement an interface between IOMMU 132 and device 150 according to an embodiment of the present invention, as further described below. Interface plug-in 140 may be integrated into device 150, root complex 130, or any other component in system 100, which may include any number of interface plug-ins. Each interface plug-in 140 may include a configuration unit 142, an access control unit 144, and a transaction unit 146, each as described below. Each interface plug-in 140 may also include a TLB 148 for caching address translations, access permissions, and/or other such information particular to the device 150 with which it is associated.

Device 150 may represent any agent, component, or device having the capability to execute a workload of, for, or associated with an application, or otherwise access system memory 120 (e.g., through direct memory access). Examples of an instance of device 150 include graphics, video, audio, media, cryptographic, input/output, network, or other processors, coprocessors, accelerators, controllers, or other agents or devices. Although shown as a separate block in FIG. 1, an instance of device 150 may be discrete or integrated/packaged into/with any other component or device within system 100. Furthermore, although FIG. 1 shows only one such device 150, any number of devices may interface with secure processing environments according to embodiments of the present invention. In various embodiments, device 150 and root complex 130 may function and be connected to each other according to or otherwise comply with one or more versions of a Peripheral Component Interconnect Special Interest Group (PCI-SIG) specification.

Any number of various instances of device 150 (whether the same or different type of device) may be architecturally grouped together in a device group (DEVGRP), such that an access control policy may be applied to devices at a group level, where each device in a particular DEVGRP has the same access control attributes and may operate within the same enclave. In an embodiment, an architectural definition of a system may support sixty-four DEVGRPs, each with a unique identifier value (e.g., 0 to 63), where each device 150 may belong to exactly one DEVGRP.

Each device 150 may support one or more logical engines (each, an LE), where an LE is a programmable abstraction presented by the device to perform a device function, executing within a single context at any given time. Therefore, more than one device workload may be executed according to an embodiment of the present invention by a single device 150 independently and/or in parallel, with each workload being executed by a different LE. Multiple LEs within a single device 150 may share an interface plug-in 140 associated with the device. Each LE may be set to operate either within an enclave according to an embodiment of the present invention (i.e., in "enclave mode") or according to any prior approach, for example, by the hardware of its interface plug-in 140 after its interface plug-in 140 successfully completes an enclave entry protocol with IOMMU 132.

In an embodiment, an LE type (LE_TYPE) may be assigned to each LE, where the LE_TYPE depends on the instruction set architecture (ISA) of the LE. LEs of the same LE_TYPE and in the same DEVGRP are software compatible with each other. A single device 150 may present or support multiple LEs, in any combination of the same or different LE_TYPEs. In an embodiment in which device 150 represents a graphics processor, the graphics processor may present two different LEs, each of a different LE_TYPE, a first to perform rendering (a render engine) and a second to perform bit blit operations (a blit engine).

System 100 may also include any number of storage, peripheral, input/output (I/O), or other components or devices, such as component 160 (e.g., flash memory, solid state drive, magnetic drive, optical drive, display, touchscreen, keyboard, microphone, speaker, other audio device, camera, video or other media device, network adapter, motion or other sensor, receiver for global positioning or other information, etc.).

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention, or portion thereof, may be implemented.

Processor 110 may operate according to an instruction set architecture that includes the following instructions, each as further described below: a first instruction to create a secure enclave, a second instruction to add content to an enclave, a third instruction to measure content of an enclave, a fourth instruction to initialize an enclave, and a fifth instruction to enter an enclave. Although embodiments of the present invention may be practiced with a processor having any instruction set architecture and are not limited to the architecture of a processor family from Intel® Corporation, the instructions may be part of a set of software protection extensions to an existing architecture, and may be referred to herein as an ECREATE instruction, an EADD instruction, an EEXTEND instruction, an EINIT instruction, and an EENTER instruction. Support for these instructions may be implemented in a processor using any combination of circuitry and/or logic embedded in hardware, microcode, firmware, and/or other structures arranged as described below or according to any other approach, and is represented in FIG. 1 as ECREATE logic/hardware 1101, EADD logic/hardware 1102, EEXTEND logic/hardware 1103, EINIT logic/hardware 1104, and EENTER logic/hardware 1105.

Figure 2:
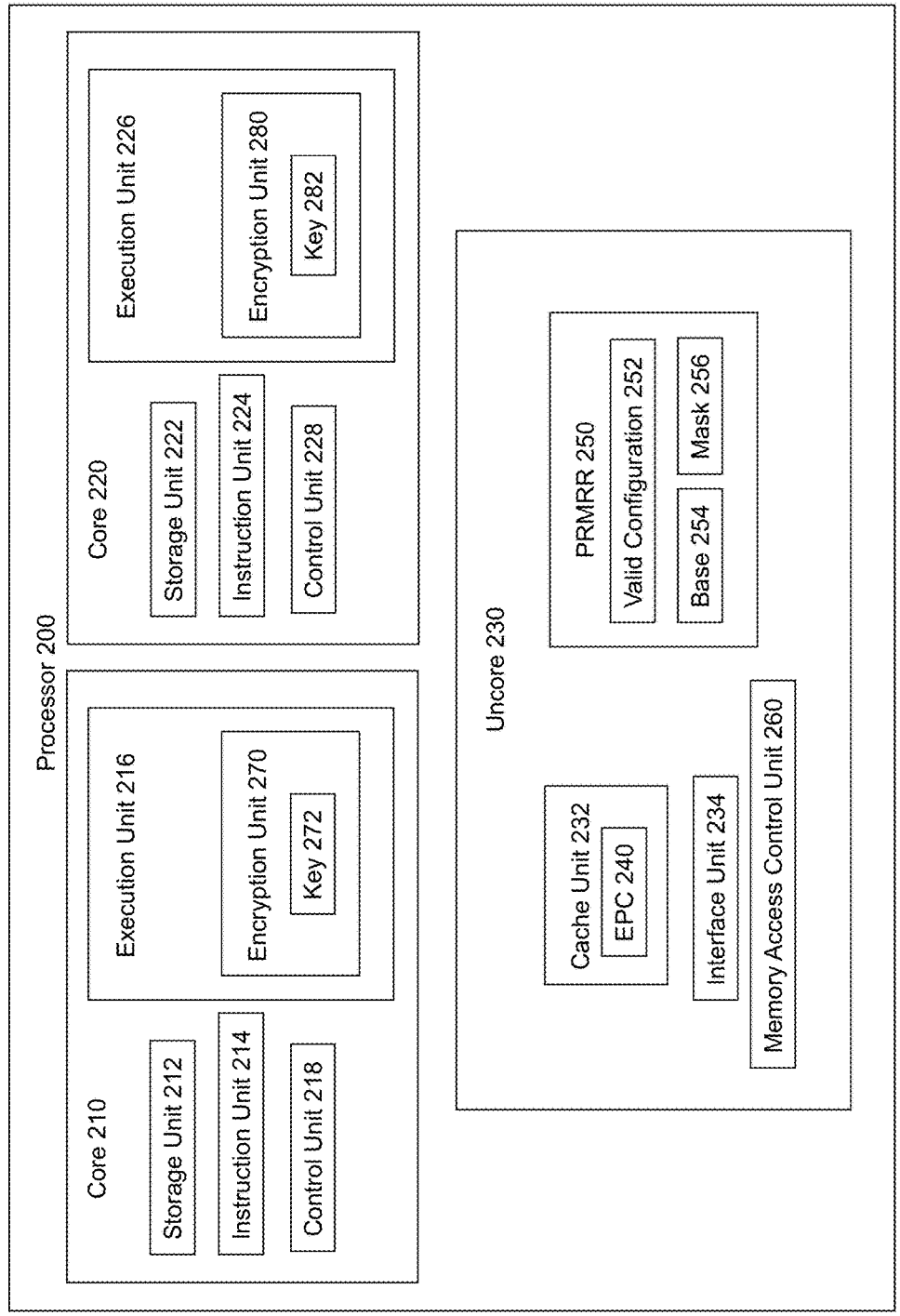
FIG. 2 illustrates a processor including support for an interface between a device and a secure processing environment according to an embodiment of the present invention.

FIG. 2 illustrates processor 200, an embodiment of which may serve as processor 110 in system 100. Processor 200 may include core 210, core 220, and uncore 230. Core 210 may include storage unit 212, instruction unit 214, execution unit 216, and control unit 218. Core 220 may include storage unit 222, instruction unit 224, execution unit 226, and control unit 228. Uncore 230 may include cache unit 232, interface unit 234, processor reserved memory range registers 250, and memory access control unit 260. Processor 200 may also include any other circuitry, structures, or logic not shown in FIG. 2. The functionality of the ECREATE logic/hardware 1101, the EADD logic/hardware 1102, the EEXTEND logic/hardware 1103, the EINIT logic/hardware 1104, and the EENTER logic/hardware 1105, as introduced above and further described below, may be contained in or distributed among any of the labeled units or elsewhere in processor 200. Furthermore, the functionality and or circuitry of each of the described and/or illustrated units of processor 200 may be combined and/or distributed in any manner.

Storage units 212 and 222 may include any combination of any type of storage usable for any purpose within cores 210 and 220, respectively; for example, they may include any number of readable, writable, and/or read-writable registers, buffers, and/or caches, implemented using any memory or storage technology, in which to store capability information, configuration information, control information, status information, performance information, instructions, data, and any other information usable in the operation of cores 210 and 220, respectively, as well as circuitry usable to access such storage.

Instruction units 214 and 224 may include any circuitry, logic, structures, and/or other hardware, such as an instruction decoder, to fetch, receive, decode, interpret, schedule, and/or handle instructions to be executed by cores 210 and 220, respectively. Any instruction format may be used within the scope of the present invention; for example, an instruction may include an opcode and one or more operands, where the opcode may be decoded into one or more micro-instructions or micro-operations for execution by execution unit 216 or 226, respectively. One or more instructions, such as the ECREATE, EADD, EEXTEND, EINIT, and EENTER instructions, may be leaves of a first single opcode, such as a privileged secure enclave opcode (e.g., ENCLS), or a second single opcode, such as an unprivileged secure enclave opcode (e.g., ENCLU), where the leaf instructions are specified by the value in a processor register (e.g., EAX). Operands or other parameters may be associated with an instruction implicitly, directly, indirectly, or according to any other approach.

Execution units 216 and 226 may include any circuitry, logic, structures, and/or other hardware, such as arithmetic units, logic units, floating point units, shifters, etc., to process data and execute instructions, micro-instructions, and/or micro-operations. Each of execution units 216 and 226 may represent any one or more physically or logically distinct execution units. Execution units 216 and 226 may include encryption units 270 and 280 respectively, which may represent any dedicated or shared circuitry, logic, structures, and/or other hardware to execute any one or more encryption algorithms and the corresponding decryption algorithms, to execute any one or more secure hashing algorithms, and/or to generate any one or more message authentication codes (MACs). Encryption units 270 and 280 may use a key, such as key 272 and 282, respectively, each of which may represent any key, such as a processor or platform unique key programmed into processor 200 in a fuse array, generated during a boot process, and/or otherwise available as a secret key to be used for cryptography, for generating MACs, or for any other purpose.

Control units 218 and 228 may include any microcode, firmware, circuitry, logic, structures, and/or hardware to control the operation of the units and other elements of cores 210 and 220, respectively, and the transfer of data within, into, and out of cores 210 and 220. Control units 218 and 228 may cause cores 210 and 220 and processor 200 to perform or participate in the performance of method embodiments of the present invention, such as the method embodiments described below, for example, by causing cores 210 and 220 to execute instructions received by instruction units 214 and 224 and micro-instructions or micro-operations derived from instructions received by instruction units 214 and 224.

Cache unit 232 may include any number of cache arrays in one or more levels of cache memory in a memory hierarchy of information processing system 100, implemented in static random access memory or any other memory technology, along with circuitry, structures, and/or other hardware to control and/or provide for their use and maintenance. Cache unit 232 may be shared among any number of cores and/or logical processors within processor 200 according to any approach to caching in information processing systems. Cache unit 232 may also include one or more memory arrays to be used as enclave page cache (EPC) 240 as further described below.

Interface unit 234 may represent any circuitry, logic, structures, and/or other hardware, such as a link unit, a bus unit, or a messaging unit to allow processor 200 to communicate with other components in a system such as system 200 through any type of bus, point to point, or other connection, directly or through any other component, such as a bridge, hub, or chipset. Interface unit 234 may include one or more integrated memory controllers to communicate with a system memory such as system memory 120 or may communicate with a system memory through one or more memory controllers external to processor 200.

Processor reserved memory range registers (PRMRR) 250 may represent any one or more storage locations in storage units 212 and 222, elsewhere in processor 200, and/or copies thereof in uncore 230. PRMRR 250 may be used, for example by configuration firmware such as a basic input/output system, to reserve one or more physically contiguous ranges of memory called processor reserved memory (PRM). Memory access control unit 260 may represent any circuitry, structures, logic, and/or other hardware anywhere in processor 200 that may control access to PRM such that EPC 240 may be created within the system memory space defined as PRM.

In an embodiment, PRM is of a size that is an integer power of two, e.g. 32 MB, 64 MB, or 128 MB, and is aligned to a memory address that is a multiple of that size. PRMRR 250 may include one or more instances of a read-only PRMMR valid configuration register 252 to indicate the valid sizes to which PRM may be configured, one or more instances of a PRMMR base register 254 and a PRMMR mask register 256 to define one or more base addresses and ranges of PRM.

EPC 240 is a secure storage area in which software may be protected from attacks by malware operating at any privilege level. One or more secure enclaves may be created such that each enclave may include one or more pages or other regions of EPC 240 in which to store code, data, or other information in a way that it may only be accessed by software running inside that enclave (except as otherwise provided for by an embodiment of the present invention). For example, a secure enclave may be used by a software application so that only that software application, while running inside that enclave, may access the contents of that enclave. No other software, not even an operating system or a virtual machine monitor, may read the unencrypted contents of that enclave, modify the contents of that enclave, or otherwise tamper with the contents of that enclave while the content is loaded into the EPC (assuming that the enclave is a production enclave, as opposed to, for example, a debug enclave). However, the contents of the enclave may be accessed by software executing from within that enclave on any processor in system 100. This protection is accomplished by the memory access control unit 260 operating according to the secure enclaves architecture.

In FIG. 2, EPC 240 is shown in cache unit 232, where it may be a sequestered portion of a shared cache or a dedicated memory. Within or on the same die as processor 200, EPC 240 may be implemented in static random access memory, embedded dynamic random access memory, or any other memory technology. EPC 240 may also or additionally be implemented external to processor 200, for example within a secure region of system memory 120. To protect the content of secure enclaves when it is not stored on-die, encryption units 270 and/or 280 may be used to encrypt the content before it is transferred off-die and to decrypt the content transferred back into EPC 240 on-die. Other protection mechanisms may also be applied to protect the content from replay and other attacks.

Figure 3:
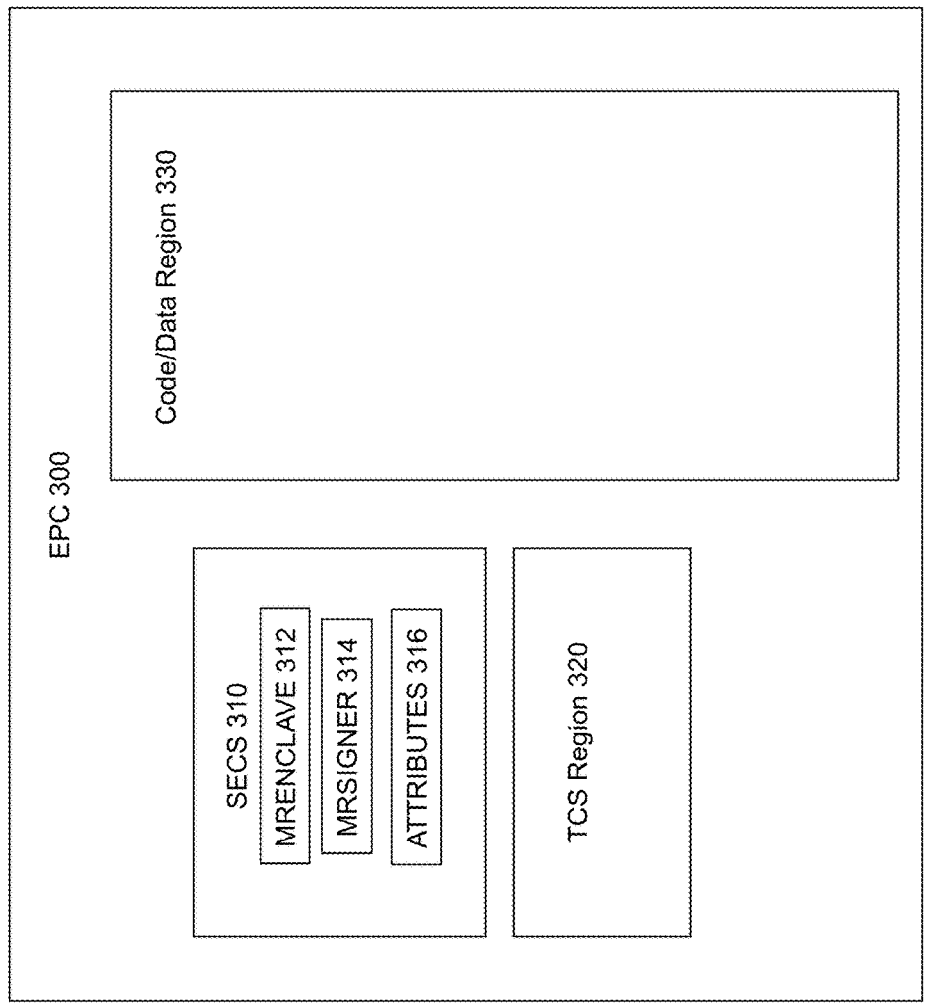
FIG. 3 illustrates an enclave page cache according to an embodiment of the present invention.

FIG. 3 illustrates EPC 300, an embodiment of which may serve as EPC 240 in FIG. 2. In FIG. 3, EPC 300 includes secure enclave control structure (SECS) 310, thread control structure (TCS) region 320, and code/data region 330. Although FIG. 3 shows EPC 300 divided into three separate regions, EPC 300 may be divided into any number of chunks, regions, or pages, each of which may be used for any type of content. In one embodiment, EPC 300 is divided into 4 kilobyte (KB) pages and is aligned to an address in system memory 120 that is a multiple of 4 KB, SECS 310 may be any one of the 4 KB pages in EPC 300, TCS region 320 may be any number of contiguous or non-contiguous 4 KB pages, and code/data region 330 may be any number of contiguous or non-contiguous 4 KB pages. Furthermore, although FIG. 3 shows one SECS, one TCS region, and one code/data region corresponding to one secure enclave, an EPC may include any number of SECS and any number of TCS and code/data regions, so long as each enclave has one and only one SECS, each valid TCS and valid code/data region (e.g., page) belongs to one and only one enclave, and all of the SECS, TCS, code/data pages fit within the EPC (or may be paged out of and back into the EPC).

An SECS may be created by the execution of the ECREATE instruction to contain metadata to be used by hardware, and accessible only by hardware (i.e., not readable, writable, or otherwise accessible by software, whether running inside or outside the enclave), to define, maintain, and protect the enclave. For example, SECS 310 includes a first measurement register (MRENCLAVE) 312, which may be any size field within SECS 310; in one embodiment, MRENCLAVE 312 may be 32 bytes. MRENCLAVE 312 is to store the build measurement (as described below) of the enclave, which is initialized by the ECREATE instruction, updated by every EADD and EEXTEND instruction associated with the enclave, and locked by the EINIT instruction associated with the enclave. SECS 310 also includes a second measurement register (MRSIGNER) 314 to store a measurement of an identifier, such as a public key, of the entity that verified the creation of the enclave, as further described below. In one embodiment, MRSIGNER 314 may be 32 bytes. Enclave attributes, as described below, may be stored in ATTRIBUTES field 316, which in one embodiment may have a size of 16 bytes.

One or more TCSs may also be associated with a secure enclave. A TCS is a data structure containing metadata used by the hardware to save and restore thread specific information when entering and exiting the enclave. In an embodiment, one or more device TCS (DTCS) may be associated with an enclave, each to provide for a device 150 to enter and exit the enclave. A DTCS may include a field to specify the LE_TYPE of an LE that may enter the enclave using that DTCS. Accordingly, an LE may enter an enclave through the enclave's DTCS if the DTCS is accessible from the LE's DEVGRP and the LE_TYPE of the LE matches the LE_TYPE specified in the DTCS. For example, for an application executing on a processor within an enclave to offload work to a render engine in a graphics processor, it would create a DTCS in the enclave that is accessible from the DEVGRP that includes the graphics processor and that has LE_TYPE set to the LE_TYPE of the render engine.

The security attributes of each page are stored in a micro-architectural data structure called an enclave page cache map (EPCM) that is used by memory access control unit 260 to enforce the protections provided by the secure enclaves architecture. The EPCM stores one entry for each page in the EPC. Each entry includes an identifier (e.g., a 64 bit field) of the SECS (i.e., the enclave) to which the page belongs. These identifiers may be referred to by secure enclaves instructions (e.g., the address of the SECS may be stored in a register such as RCX, the address of a micro-architectural data structure including the address of the SECS may be stored in a register such as RBX, etc.) such as EADD, EEXTEND, and EINIT, to provide for the SECS to be read by hardware in order to execute the instruction.

Figure 4:
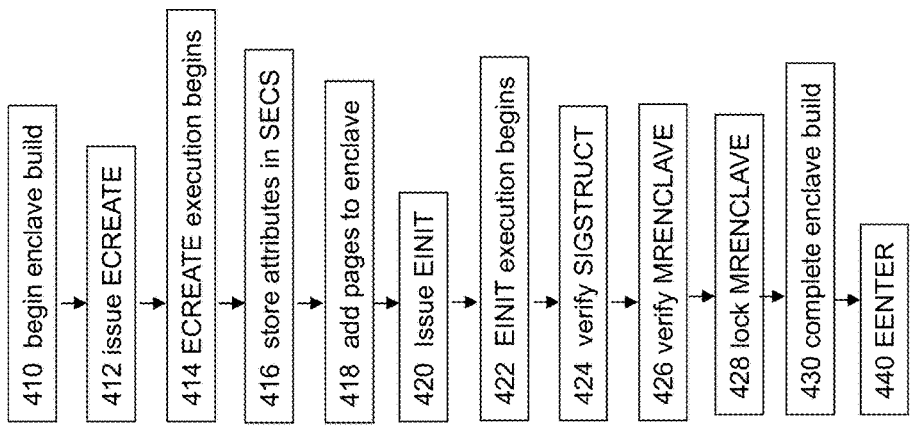
FIG. 4 illustrates a method for building a secure processing environment according to an embodiment of the present invention.

FIG. 4 illustrates a method 400 for building a secure processing environment to according to an embodiment of the present invention. Although method embodiments of the invention are not limited in this respect, reference may be made to elements of FIGS. 1, 2, and 3 to help describe the method embodiment of FIG. 4. Method 400 includes the building of a secure enclave using ECREATE, EADD, EEXTEND, EINIT, and EENTER instructions; however, embodiments of the present invention are not limited to these specifically named instructions. Various portions of method 400 may be performed independently by or with a combination of hardware (e.g., instruction unit 214/224, execution unit 216/226, and/or control unit 218/228), firmware, software, a user of an information processing system, etc.

In box 410 of method 400, a build of an enclave begins. In box 412, an ECREATE instruction is issued, for example by an installer application, to create the enclave. In box 414, execution of the ECREATE instruction, for example by execution unit 216 or 226, begins. In one embodiment, execution of the ECREATE instruction includes the allocation of a range of addresses for use by the enclave. In one embodiment, the addresses may be a first type of address, for example a virtual or linear addresses, to be translated to a second type of address, for example a physical address in a system memory such as system memory 120.

Execution of the ECREATE instruction may also include, in box 416, establishing attributes of the enclave and storing the enclave attributes in an SECS, for example, in ATTRIBUTES field 316 of SECS 310. A micro-architectural data structure (e.g., PAGEINFO), may be associated with the ECREATE instruction (e.g., its address in the RBX register). PAGEINFO may have a field specifying the address of a source SECS to be copied to SECS 310. The source SECS may include a source SECS ATTRIBUTES bit array to be copied to SECS ATTRIBUTES field 316.

In box 418, the installer application may add one or more pages (or other regions) to the enclave, for example by issuing one or more EADD instructions, and have them measured, for example by issuing one or more EEXTEND instructions. Adding a page to the enclave may include copying a source page from system memory into the EPC and associating the EPC page with the enclave's SECS. The source page may be a regular page containing unencrypted code, data, or other information for the code/data region of the enclave, or the source page may be a TCS page containing metadata for the TCS region. Having them measured may include incrementally calculating or extending a cryptographic hash based on the content, location, and/or other attributes of the page or pages, and storing the hash in MRENCLAVE 312.

In box 420, the installer application issues an EINIT instruction in order to finalize the build of the enclave and initialize it. In one embodiment, EINIT is the leaf of ENCLS with the value 0x2 in the EAX register. In box 422, execution of the EINIT instruction, for example by execution unit 216 or 226, begins.

Execution of the EINIT instruction may include, in box 424, verifying that an enclave certificate or signature structure (SIGSTRUCT) provided by the installer or signer of the enclave is valid by using the using a key included in the certificate or signature structure. Execution of the EINIT instruction may also include, in box 426, verifying that the contents of MRENCLAVE 312 matches the expected value of MRENCLAVE provided in the certificate or signature structure, where the final value of MRENCLAVE 312 may be a unique secure hash algorithm, (e.g., SHA-256) digest that identifies, cryptographically, the code and data placed inside the enclave, the position and placement order of the pages inside the enclave, and the security properties of each page.

In box 428, execution of the EINIT instruction may continue with the locking of MRENCLAVE 312 such that its contents remain unchanged, even by the subsequent execution of an EADD or an EEXTEND instruction, and the setting of an attribute indicator in the SECS to prevent any more regions or pages from being added to the enclave. In box 430, the build of the enclave is complete. In box 440, the enclave may be entered (e.g., by issuing an EENTER instruction) in order to securely execute a software application within the enclave.

Returning now to FIG. 1, each interface plug-in 140 may include a configuration unit 142, an access control unit 144, and a transaction unit 146. Configuration unit 142 may include any number of configurable/programmable storage locations, such as registers, that may be configured/programmed by firmware/software to store any of the values, indicators, or other information that is associated with the architectural definition of an interface according to an embodiment of the present invention or otherwise used by access control unit 144, transaction unit 146, or other unit, circuitry, hardware of interface plug-in 140. Configuration unit 142 may also include any number of status/control storage locations, such as registers, that may reflect the state of an associated device 150, its LE, an secure execution environment, an access or attempted access to a secure execution environment by an LE, or any other information that may be used by access control unit 144, transaction unit 146, or other unit, circuitry, hardware of interface plug-in 140.

Access control unit 144 may include any access control circuitry or other hardware, such as an access control state machine, to apply an access control policy to the device according to an embodiment of the present invention. In an embodiment, an access control state machine in access control unit 144 may operate according to the method illustrated in FIG. 6.

Transaction unit 146 may include any circuitry or other hardware to generate and receive sub-transactions between interface plug-in 140 and IOMMU 132, where these sub-transactions are used to implement an entry/exit protocol that may allow the device 150 associated with interface plug-in 140 to enter a secure processing environment, access its protected memory pages in EPC 300, and exit the secure processing environment. In an embodiment, this entry/exit protocol may be implemented according to the method illustrated in FIGS. 7A, 7B, 7C, and 7D.

Figure 5:
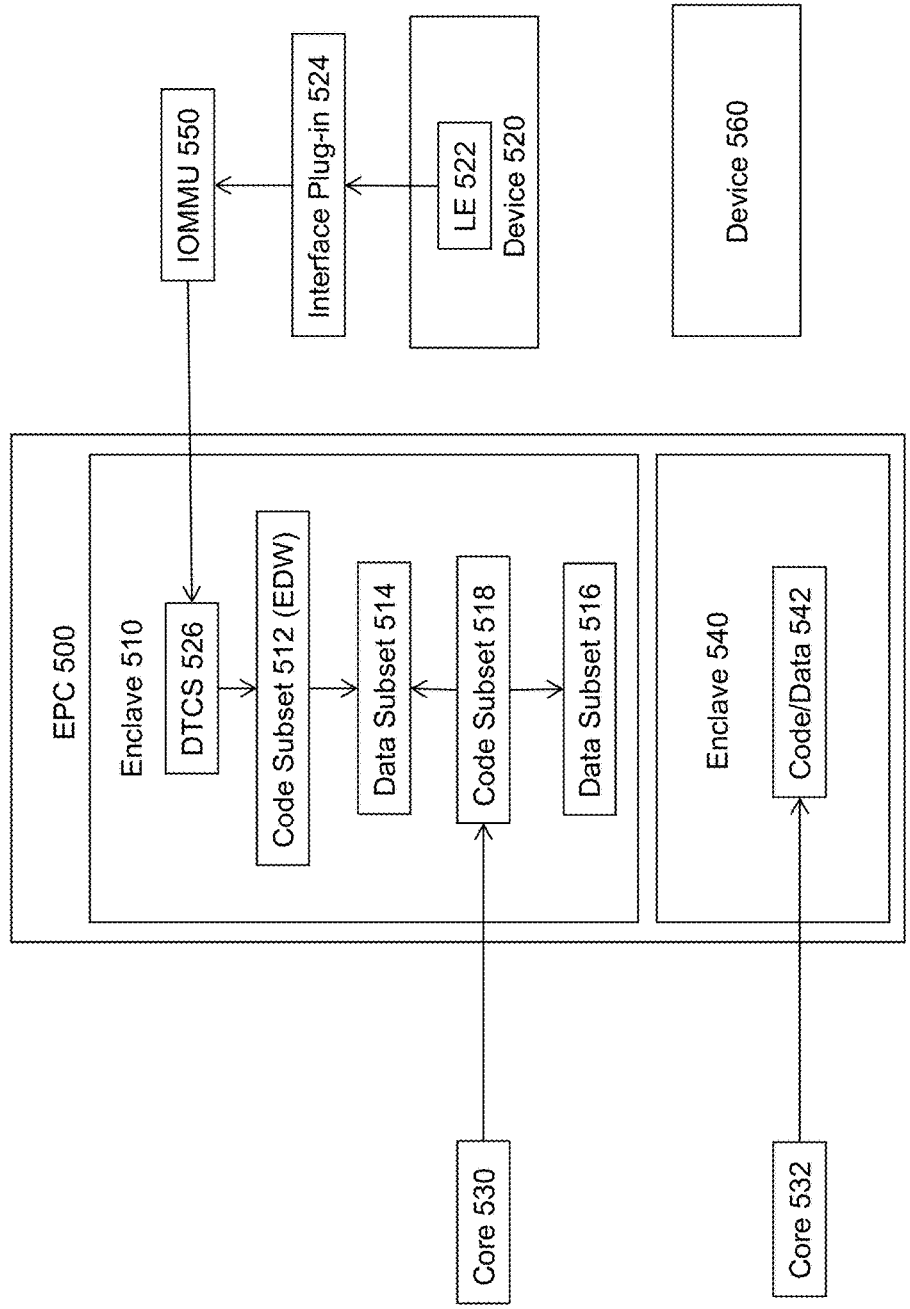
FIG. 5 illustrates trust boundaries in a system according to an embodiment of the present invention.

FIG. 5 illustrates trust boundaries in a system according to an embodiment of the present invention. In FIG. 5, enclave 510 has been built for the secure execution of a first application. Four subsets of code/data pages belonging to enclave 510 are shown within EPC 500. A first subset 512 of code pages, representing an enclave device workload (EDW) may contain instructions to be executed by LE 522 of device 520. Through these instructions, LE 522 may access a second subset 514 of data pages but not a third subset 516 of data pages. Access for LE 522 to subsets 512 and 514 may be provided through interface plug-in 524, IOMMU 550, and DTCS 526. Processor core 530, executing the first application, may access both subset 514 and subset 516, through the execution of instructions in a fourth subset of code pages 518. No other core (such as core 532) or device (such as device 560) may access any of subsets 512, 514, 516, or 518.

Also in FIG. 5, enclave 540 has been built for the secure execution of a second application. A set of code/data pages 542 belong to enclave 540, and may be accessed by processor core 532, executing the second application. No other core (such as core 530) or device (such as device 520) may access the set of code/data pages 542.

In an embodiment, the trust boundaries illustrated in FIG. 5 may be implemented using a trust policy having various levels. A first level may be defined to allow access to all enclaves so that the secure processing environment architecture may be implemented in the system. For example, the system's access control hardware, including the access control hardware of IOMMU 132 of FIG. 1 and access control unit 144 of interface plug-in 140 of FIG. 1, may be permitted to operate in the first level. A second level may be defined to allow access to all pages of one or more enclaves. For example, a core (e.g., core 530) may be permitted to operate in a second level with respect to an enclave (e.g., enclave 510). A third level may be defined to allow access to a subset of pages in an enclave. For example, a device (e.g., device 520) may be permitted to operate in a third level with respect to an enclave (e.g., enclave 510). A fourth level may be defined in which there may be no access to an enclave. For example, a device (e.g., device 560) may operate in a fourth level.

In an embodiment, access control is defined with the granularity of a page size (e.g., 4 KB); however, other approaches are possible. In an embodiment, access control is defined such that every device in a particular DEVGRP and a particular enclave has the same access permissions to enclave pages; however, other approaches are possible.

In an embodiment, an implementation of access control may include assigning values to data structure fields for each EPC page, and using these values, at least in part, to determine whether to allow or deny access. A first field, an EPC page frame number (EPFN), may be assigned a unique value for each physical page in an EPC. In an embodiment, an EPFN for a 4 KB page may be 32 bits in size to support an EPC size of 16 terabytes. A second field, a group access control vector (GRPACV), may include a bit for each of a defined number of DEVGRPs (e.g., 64). In a GRPACV for a particular EPC page, a bit corresponding to a particular DEVGRP may be set if that EPC page may be accessed, under certain conditions, by devices in that DEVGRP.

Figure 6:
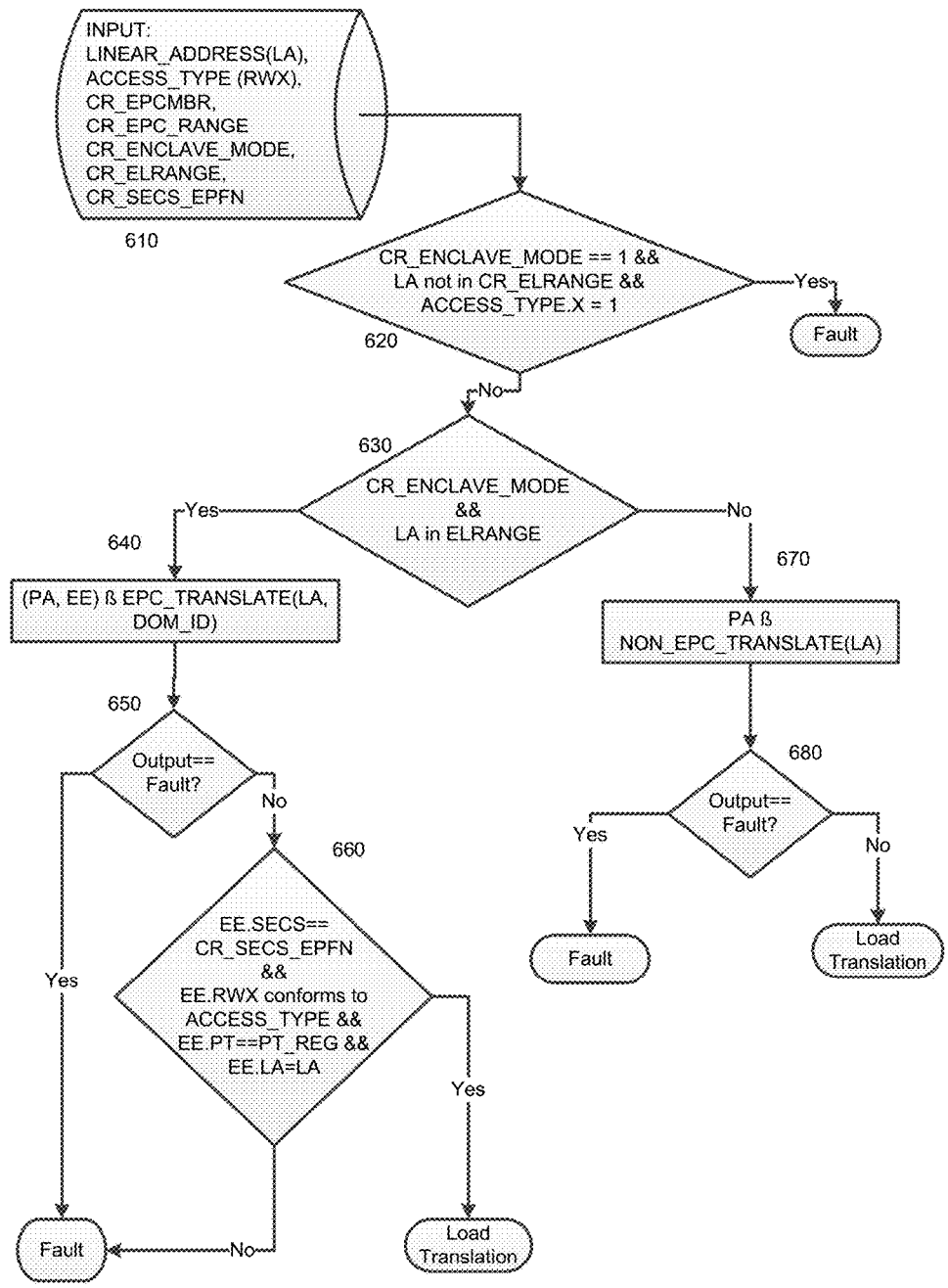
FIG. 6 illustrates a method for device access control to a secure processing environment according to an embodiment of the present invention.

FIG. 6 illustrates a method 600 for device access control to a secure processing environment according to an embodiment of the present invention. In an embodiment, an access control state machine in an interface plug-in (e.g., interface plug-in 140) may operate according to the method 600 to determine whether an LE is permitted to access and enclave. Inputs to the access control state machine are defined in Table 1, and may be provided by configuration, status, and/or control registers within or associated with the interface plug-in (e.g., in configuration unit 142), which may be set by hardware, firmware, or software.

TABLE 1

| Input | Description |
| --- | --- |
| CR_ENCLAVE_MODE | Indicates if the LE is operating in a mode in which it may access an enclave (enclave mode) |
| CR_EPCMBR | Base Address of the EPCM |
| LA | Linear Address of the Access |
| ACCESS_TYPE | Permissions needed for the Access (e.g., read, write, execute) |
| CR_EPC_RANGE | EPC Ranges |
| CR_ELRANGE | Linear Range of the Enclave |
| CR_SECS_EPFN | EPFN of the Enclave's SECS |
| DEVGRP | DEVGRP of the Device to which the LE belongs |
| CR_EPFN_DTCS | EPFN of the DTCS page through which the LE entered the Enclave |

In box 610 of method 600, input values, such as those set forth in Table 1, may be read or received. In box 620, a determination is made as to whether the LE is in enclave mode but attempting to execute code outside of the enclave. If so, a fault is generated; if not, method 600 continues to box 630.

In box 630, a determination is made as to whether the LE is in enclave mode and attempting to access the enclave. If so, method 600 continues in box 640; if not, method 600 continues in box 670.

In box 640, the linear address is translated to a physical address within the EPC. In box 650, a determination is made as to whether the translation resulted in a fault. If not, method 600 continues to box 660.

In box 660, a determination is made as to whether the access is to a regular (e.g., code/data) page with the matching address in the matching enclave and with the proper permissions. If so, the access is allowed; if not, a fault is generated.

In box 670, the linear address is translated to a physical address outside the EPC. In box 680, a determination is made as to whether the translation resulted in a fault. If not, the access is permitted.

In an embodiment, a valid translation resulting from the operation of method 600 may be cached, for example, in TLB 148 (or in a TLB in IOMMU 132, provided that it supports validity checking for multiple LEs).

FIGS. 7A, 7B, 7C, and 7D illustrate a method 700 for device entry to and exit from a secure processing environment according to an embodiment of the present invention. In an embodiment, method 700 may represent a portion of a transaction protocol between sub-transactions between an interface plug-in (e.g., interface plug-in 140) and an IOMMU 132 (e.g., IOMMU 132). In method 700, instructions in an application for which a workload is to be offloaded to a device may be executed by an LE of that device. These instructions may include an instruction to enter a secure processing environment (e.g., EENTER) and an instruction to exit the secure processing environment (e.g., EEXIT). In FIGS. 7A, 7B, 7C, and 7D, the application is represented by software 702, the LE is represented as LE 704, the interface plug-in that is associated with the LE is represented as TIP 706, and the system's IOMMU is represented as IOMMU 708.

Figure 7A:
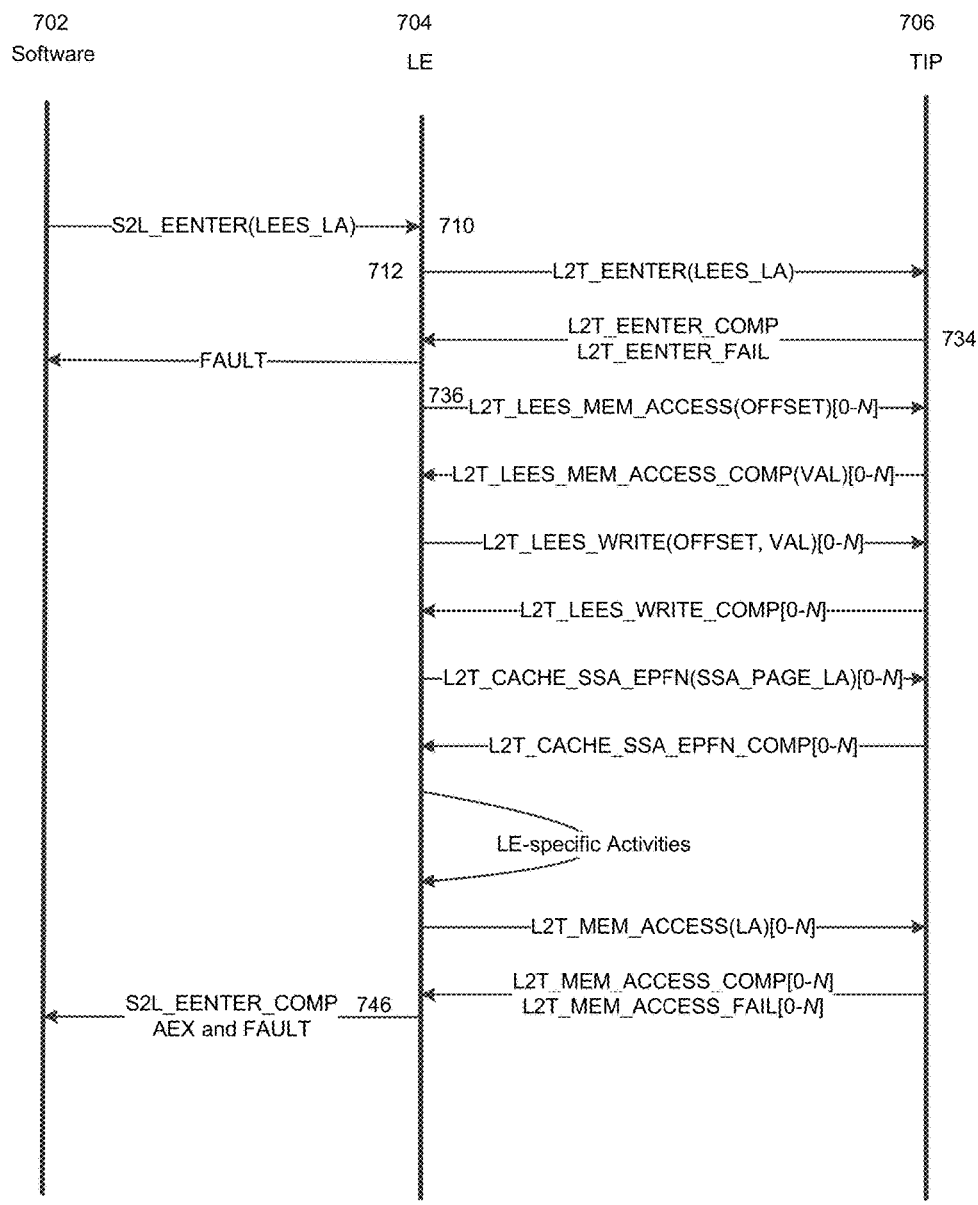
FIGS. 7A, 7B, 7C, and 7D illustrate a method for device entry to and exit from a secure processing environment according to an embodiment of the present invention.

As shown in FIG. 7A, in box 710 of method 700, LE 704 receives an EENTER instruction, with the linear address (LA) of the DTCS as a parameter, from software 702. In box 712 of FIGS. 7A and 7B, in response to receiving the EENTER instruction, LE 704 forwards a corresponding EENTER message to TIP 706.

Figure 7B:
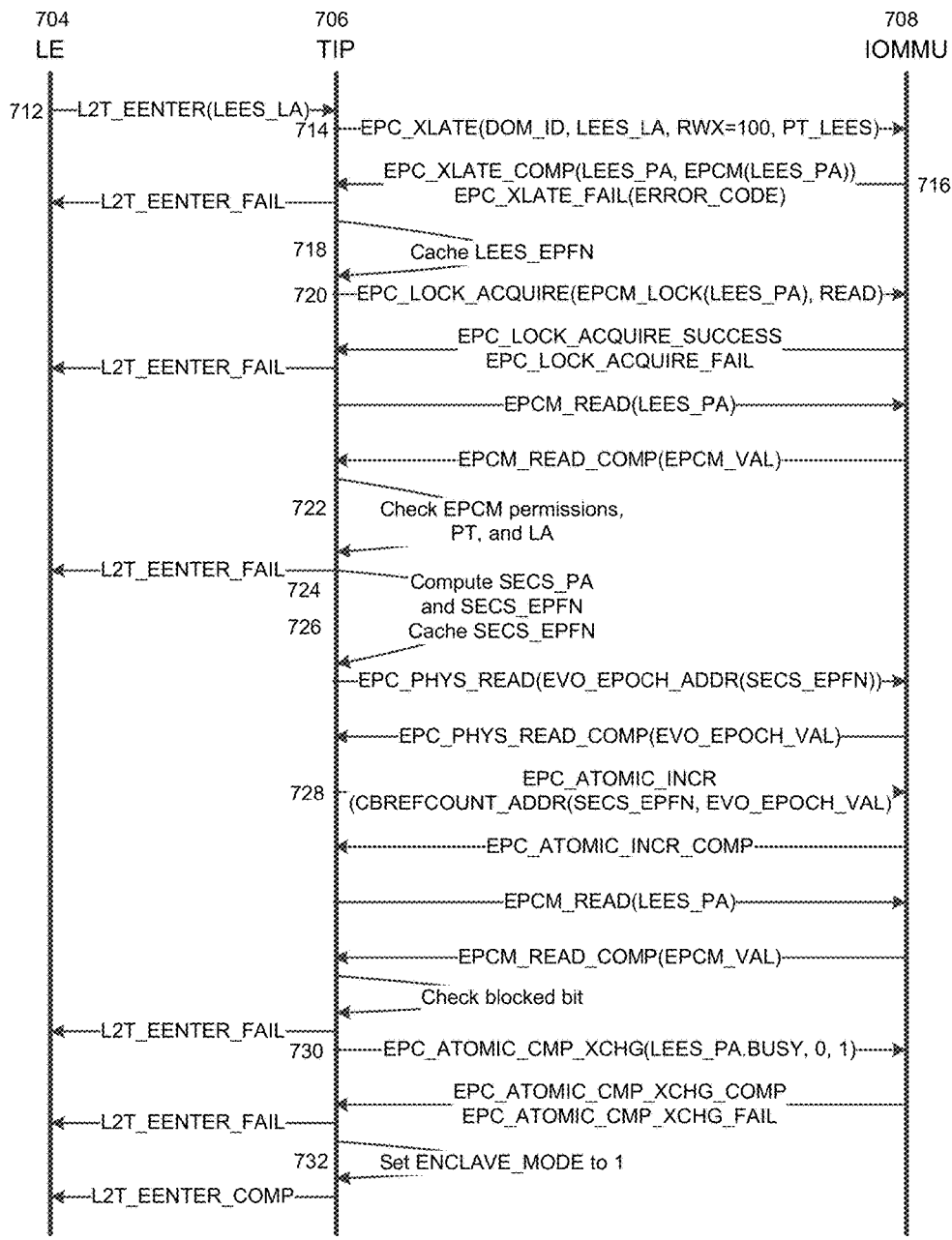

As shown in FIG. 7B, in box 714, in response to receiving the EENTER message, TIP 706 sends an EPC_XLATE message to IOMMU 708 to request a translation of the DTCS LA to a physical address (PA) and verification that the PA is in the EPC. In box 716, IOMMU 708 responds with an EPC_XLATE_COMP message to indicate completion of the translation and return the physical address. In box 718, TIP 706 records the EPFN of the DTCS page in CR_DTCS_EPFN.

In box 720, TIP 706 acquires a reader lock on the EPCM entry for the DTCS. In box 722, the EPCM page type of the DTCS page is verified to be PT_DTCS. In box 724, the SECS for the enclave to which the DTCS belongs is located. In box 726, TIP 706 records the EPFN of the SECS page in CR_SECS_EPFN. In box 728, the SECS for the enclave to be entered is updated. In box 730, the DTCS is marked active. In box 732, TIP 706 sets CR_ENCLAVE_MODE to indicate that LE 704 has entered enclave mode.

Returning to FIG. 7A, in box 734, TIP 706 responds to LE 704 with an EENTER_COMP message to indicate completion of the EENTER transaction.

Figure 7C:
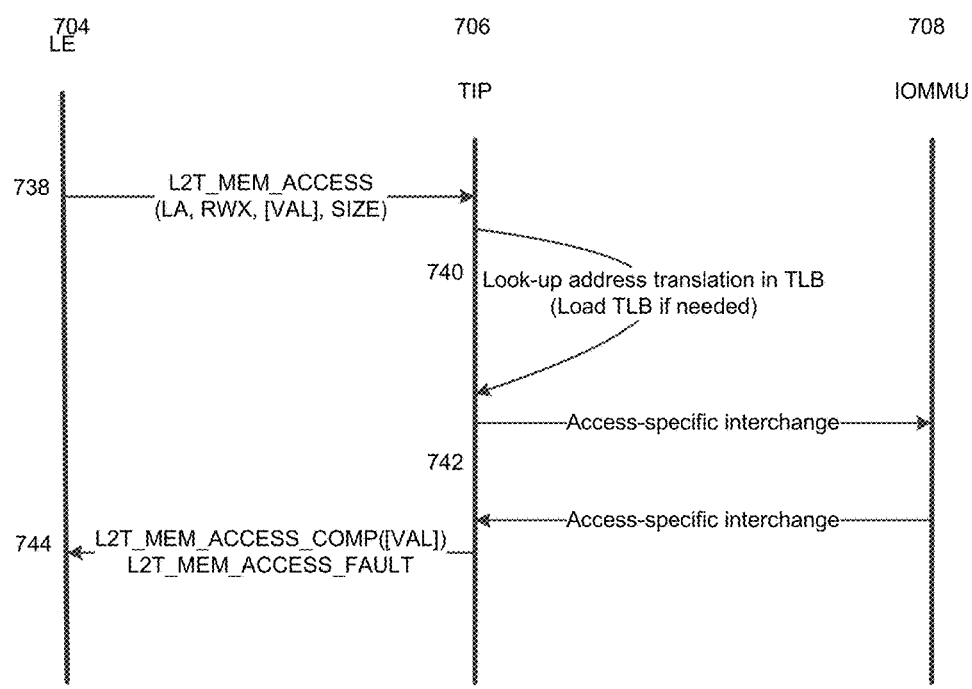

In box 736, LE 704 begins executing a workload, which is to include a sequence of transactions between LE 704 and TIP 706 in which EPC pages are accessed by providing the EPFN of the page to be accessed. For example, in box 738 as shown in FIG. 7C, LE 704 sends a MEM_ACCESS message to TIP 706. In box 740, in response to the MEM_ACCESS message, TIP 706 may check an internal TLB for a cached address translation. In box 742, also in response to the MEM_ACCESS message, an access specific interchange occurs between TIP 706 and IOMMU 708, after which, in box 744, TIP 706 sends a MEM_ACCESS_COMP message to LE 704 to indicate completion of the MEM_ACCESS transaction.

Returning to FIG. 7A, in box 746, LE 704 sends an EENTER_COMP message to indicate completion of the EENTER instruction.

However, if an error is detected at any time during execution of the workload, TIP 706 and LE 704 return a fault and exit the secure processing environment.

Figure 7D:
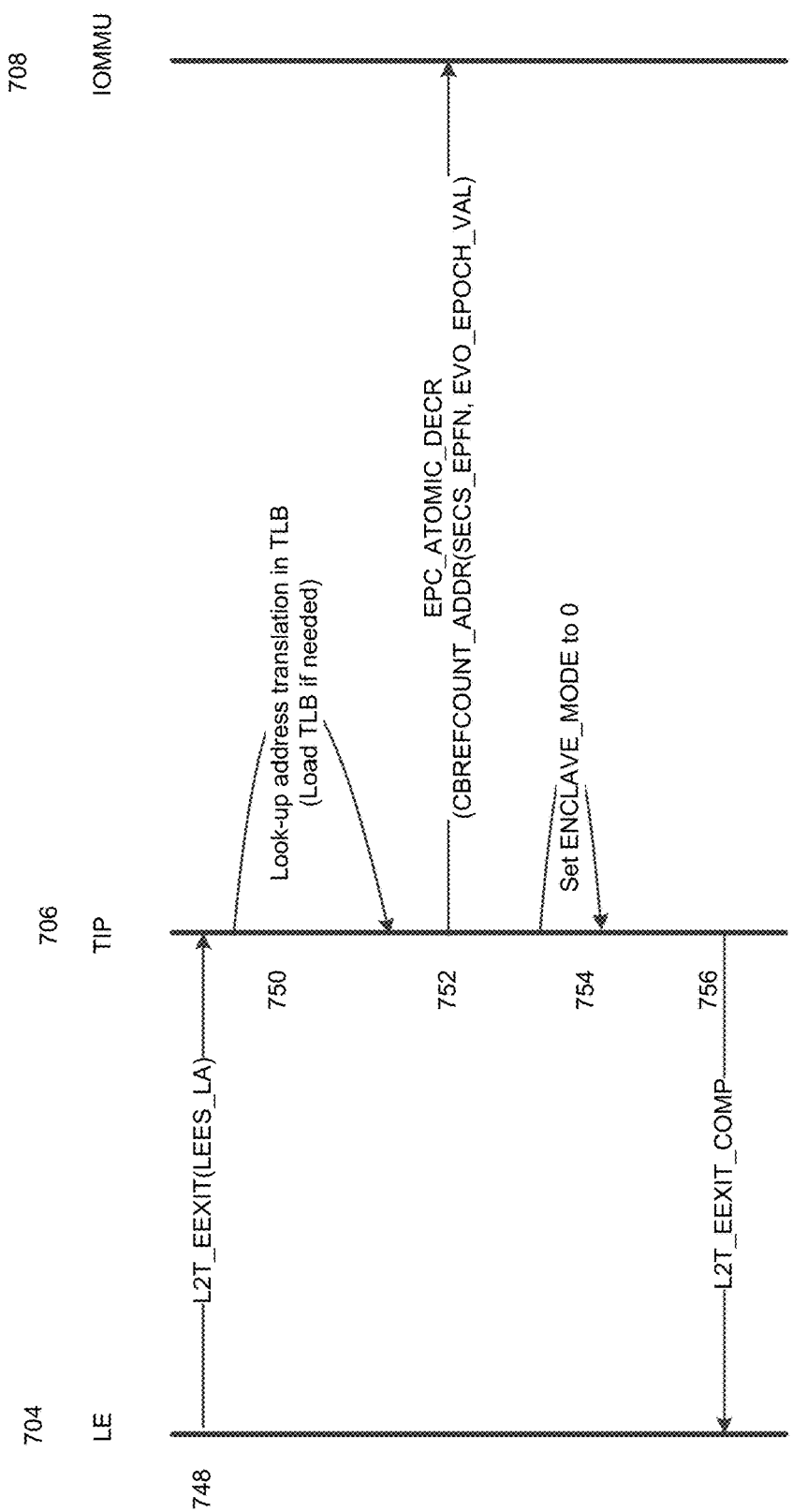

FIG. 7D illustrates the actions of the TIP 706 state machine in response to an LE 704 exiting an enclave. In box 748, LE 704 sends an EEXIT message to TIP 706. In box 750, in response to the EEXIT message, TIP 706 may check an internal TLB for a cached address translation. In box 752, also in response to the EEXIT message, TIP 706 sends a message to IOMMU 708 to update the SECS for the enclave being exited. In box 754, TIP 706 clears CR_ENCLAVE_MODE to indicate that LE 704 has exited enclave mode. In box 756, TIP 706 sends an EEXIT_COMP message to LE 704 to indicate completion of the EEXIT transaction.

In various embodiments of the present invention, methods 400, 600, and 700 may be performed in a different order, with illustrated boxes combined or omitted, with additional boxes added, or with a combination of reordered, combined, omitted, or additional boxes. Furthermore, method embodiments of the present invention are not limited to method 400, method 600, method 700, or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of methods 400, 600, and/or 700 may be embodied in software or firmware instructions that are stored on a medium readable by processor 110, interface plug-in 140, and/or device 150, which when executed by processor 110, interface plug-in 140, and/or device 150, cause processor 110, interface plug-in 140, and/or device 150 to execute an embodiment of the present invention. Also, aspects of the present invention may be embodied in data stored on a machine-readable medium, where the data represents a design or other information usable to fabricate all or part of processor 110, interface plug-in 140, and/or device 150.

Thus, embodiments of an invention for an interface between a device and a secure processing environment have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A system comprising:
    a first processor comprising:
        an instruction unit to receive a first instruction, wherein the first instruction is to create a secure processing environment, and
        an execution unit to execute an application in the secure processing environment, wherein the application is associated with a workload to be offloaded from the first processor;
    a device comprising a second processor to execute the workload to be offloaded from the first processor;
    a memory space reserved for the secure processing environment, wherein
        the memory space is external to the device and external to the second processor, and the application is to write the workload to be offloaded from the first processor into a range of addresses of the memory space; and
    an interface plug-in associated with the device, wherein the interface plug-in comprises:
        a transaction unit to enable the second processor to enter the secure processing environment created by the first processor to execute the code for the workload offloaded from the first processor within the secure processing environment, and
        a first access control unit to control access by the second processor to the memory space reserved for the secure processing environment.

2. The system of claim 1, wherein the first access control unit is to allow the second processor to access only a first subset of the memory space reserved for the secure processing environment.

3. The system of claim 2, further comprising a second access control unit to allow the first processor to access the first subset and a second subset of the memory space reserved for the secure processing environment.

4. The system of claim 3, further comprising an input/output memory management unit to translate a first address provided by the second processor to a second address for accessing the memory space.

5. The system of claim 4, wherein the transaction unit implements a secure processing environment entry protocol to enable the second processor to enter the secure processing environment.

6. The system of claim 5, wherein the transaction unit is also to send and receive messages between the second processor and the interface plug-in according to the secure processing environment entry protocol.

7. The system of claim 6, wherein the transaction unit is also to send and receive messages between the interface plug-in and the input/output memory management
   unit according to the secure processing environment entry protocol.

8. A method comprising:
   creating, by a first processor, a secure processing environment having a reserved memory space;
   loading, by the first processor, an application into the reserved memory space, wherein the application is associated with a workload to be offloaded from the first processor;
   entering, by a second processor of a device, the secure processing environment created by the first processor using a protocol provided by a transaction unit of an interface plug-in associated with the device, wherein the reserved memory space is external to the device and external to the second processor;
   adding, by the application, code for the workload to be offloaded from the first processor to a subset of memory addresses of the reserved memory space, the subset of memory addresses comprising a range of addresses of the reserved memory space;
   executing, by the second processor, the code for the workload offloaded from the first processor in the secure processing environment created by the first processor; and
   controlling, by an access control unit of the interface plug-in, access from the second processor to the reserved memory space.

9. The method of claim 8, wherein controlling access includes allowing the second processor to access a first subset of the reserved memory space.

10. The method of claim 9, wherein controlling access includes preventing the second processor from accessing a second subset of the reserved memory space, wherein the first processor is allowed to access the first and the second subset of the reserved memory space.

11. The method of claim 10, wherein entering the secure processing environment includes sending and receiving messages between the second processor and the transaction unit of the interface plug-in.

12. The method of claim 11, wherein entering the secure processing environment includes sending and receiving messages between the transaction unit of the interface plug-in and an input/output memory management unit.

13. An apparatus comprising:
   an access control unit to control access from a second processor of a device to a memory space reserved for a secure processing environment created by a first processor, wherein the memory space is external to the second processor and external to the device; and a transaction unit to implement a secure processing environment entry protocol for the second processor to enter the secure processing environment created by the first processor, wherein the second processor is to execute, within the secure processing environment, code stored within the memory space, wherein an application to execute in the secure processing environment is to write the code comprising a workload to be offloaded from the first processor to the second processor to a subset of memory addresses of the memory space, and wherein the second processor is a logical engine of the device, and the device is coupled to the secure processing environment via an input/output memory management unit and an interface plug-in comprising the transaction unit and the access control unit.

14. The apparatus of claim 13, wherein the access control unit is to allow the second processor to access only a first subset of the memory space reserved for the secure processing environment.

15. The apparatus of claim 14, wherein the first processor is allowed to access the first subset and a second subset of the memory space reserved for the secure processing environment.

16. The apparatus of claim 15, wherein the transaction unit is also to send and receive messages between the second processor and the apparatus according to the secure processing environment entry protocol.

17. The apparatus of claim 16, wherein the transaction unit is also to send and receive messages between the apparatus and an input/output memory management unit according to the secure processing environment entry protocol.

18. The system of claim 1, wherein
   the second processor is a logical engine of the device, and
   the device is coupled to the secure processing environment via the interface plug-in and an input/output memory management unit.

19. The method of claim 8, wherein
   the second processor is a logical engine of the device, and
   the device is coupled to the secure processing environment via the interface plug-in and an input/output memory management unit.

20. The system of claim 1, wherein
   the second processor is to provide a linear address for a portion of the code contained within the subset of the range of addresses of the memory space to an input/output memory management unit,
   the input/output memory management unit is to translate the linear address to a physical address within the memory space, and
   the second processor is to execute code stored at the physical address within the secure processing environment.

21. The method of claim 8, further comprising:
   providing, by the second processor, a linear address for a portion of the code contained within the subset of the range of addresses of the memory space to an input/output memory management unit,
   translating, by the input/output memory management unit, translate the linear address to a physical address within the memory space, and
   executing, by the second processor, code stored at the physical address within the secure processing environment.

22. The apparatus of claim 13, wherein
   the second processor is to provide a linear address for a portion of the code contained within the subset of the range of addresses of the memory space to an input/output memory management unit,
   the input/output memory management unit is to translate the linear address to a physical address within the memory space, and the second processor is to execute code stored at the physical address within the secure processing environment.

\* \* \* \* \*